(12) United States Patent
Crochet et al.

(10) Patent No.: US 6,390,119 B1
(45) Date of Patent: May 21, 2002

(54) MANWAY COVER SYSTEM

(75) Inventors: Kevin Crochet, Metairie; Edward A. Sentilles, III, Lacombe, both of LA (US)

(73) Assignee: Provacon, Inc., Gonzales, LA (US)

( * ) Notice: Subject to any disclaimer, the term of this patent is extended or adjusted under 35 U.S.C. 154(b) by 0 days.

(21) Appl. No.: 09/503,893

(22) Filed: Feb. 15, 2000

(51) Int. Cl.[7] ............................................... F16K 27/08
(52) U.S. Cl. ..................... 137/347; 105/360; 137/382
(58) Field of Search .......................... 137/347, 348, 137/349, 350, 377, 382; 105/360

(56) References Cited

U.S. PATENT DOCUMENTS 1,156,469 A * 10/1915 Dodge ......................... 137/347
2,102,124 A * 12/1937 Lithgow
5,690,141 A * 11/1997 Creaghe ...................... 137/382

* cited by examiner

Primary Examiner—A. Michael Chambers
(74) Attorney, Agent, or Firm—Jones, Walker, Waechter, Poitevent, Carrere & Denegre, L.L.P.

(57) ABSTRACT

A manway cover system used to cover an opening in a tank, the manway cover system having a manway with a top and a bottom surface, at least one valve mounting area on the top surface for mounting a valve thereon, and a hood contact area surrounding each valve mounting area. The hood contact area is that portion of the top surface of the manway to be contacted by an emergency hood if an emergency hood was installed. The system further includes a flange, the flange being attachable to the manway, the flange covering a portion of the hood contact area when so attached. The flange further has an opening therethrough adapted to allow attachment of the flange on the manway without removal of a valve when mounted on the valve mounting area.

13 Claims, 9 Drawing Sheets

MANWAY COVER SYSTEM

TECHNICAL FIELD

This invention relates to manways used to cover the opening in tanks and allowing access to the interior of tanks; in particular, the invention relates to a device for protecting specific areas on the manway.

BACKGROUND ART

Tanker cars used to transport hazardous materials are subject to severe limitations due to standards imposed by various governing bodies, such as The Chlorine Institute and the American Association of Railroads. For instance, a valve must be attachable to the industry standard manway cover which covers the opening in the tanker railcar or other transport vehicles, such as a river tank barge or highway trailer tanker or ISO storage transport tanks (collectively, "tanker"). One standard manway has five openings for the attachment of four loading valves (two for liquids and two for gasses) and a pressure relief valve. Further, all five valves must fit within the confines of the protective dome covering, the manway. A more restrictive requirement is that each individual valve must be sized to fit within the confines of an emergency hood, generally a cylindrical space of height 13.5 inches with radius of 3 inches (for the loading valves). The emergency hood is a device for sealing one of the five valves attached to the manway in the event of a leaking valve. In this fashion, a leaking valve can be isolated without removing the tanker from service and without the need to remove the defective valve until the tanker is scheduled for maintenance. To be effective, the emergency hood must sealingly isolate the leaking valve. Currently, emergency hoods are cylindrically shaped with an opening at one end. On the open end is placed a gasket, which, when the hood is installed, rests against the surface of the manway cover. Downward pressure on the hood forces the gasket surface into sealing contact with manway cover surface. Unfortunately, the surface of the manway may have become pitted, etched or contain other such surface blemish due to exposure to weather, exposure to hazardous cargo, or physical abuse. Once surface blemishes develop in the area of the emergency hood sealing gasket, the hood sealing gasket may perform inadequately, that is, may not properly seal the leaking valve.

Due to the possibility of surface blemishes in the seal area, existing means of attaching the emergency hood must provide substantial downward force on the hood seal to attempt to isolate the surface blemishes. The current means of attaching an emergency hood are cumbersome and bulky.

SUMMARY OF THE INVENTION

A manway cover system used to cover an opening in a tank, the manway cover system having a manway with a top and a bottom surface, at least one valve mounting area on the top surface for mounting a valve thereon, and a hood contact area surrounding each valve mounting area. The hood contact area is that portion of the top surface of the manway to be contacted by an emergency hood if an emergency hood was installed. The system further includes a flange, the flange being attachable to the manway, the flange covering a portion of the hood contact area when so attached. The flange further has an opening therethrough adapted to allow attachment of the flange on the manway without removal of a valve when mounted on the valve mounting area. A gasket is interposed between the flange and the hood contact area, thereby protecting the hood contact area from the exterior elements. Also included is a new emergency hood, adapted to replace the flange and seal a leaking valve.

OBJECTS OF THE INVENTION

Accordingly, it is an object of the present invention to provide a manway cover system which protects the hood contact area on a manway from the exterior environment.

It is another object of the invention to provide a manway cover system which allows for an emergency hood to directly attach to a manway without the need for large downward forces.

It is another object of the invention to have a flange installed on a manway which can be removed without removing installed valves.

DETAILED DESCRIPTION OF THE INVENTION

Figure 1:
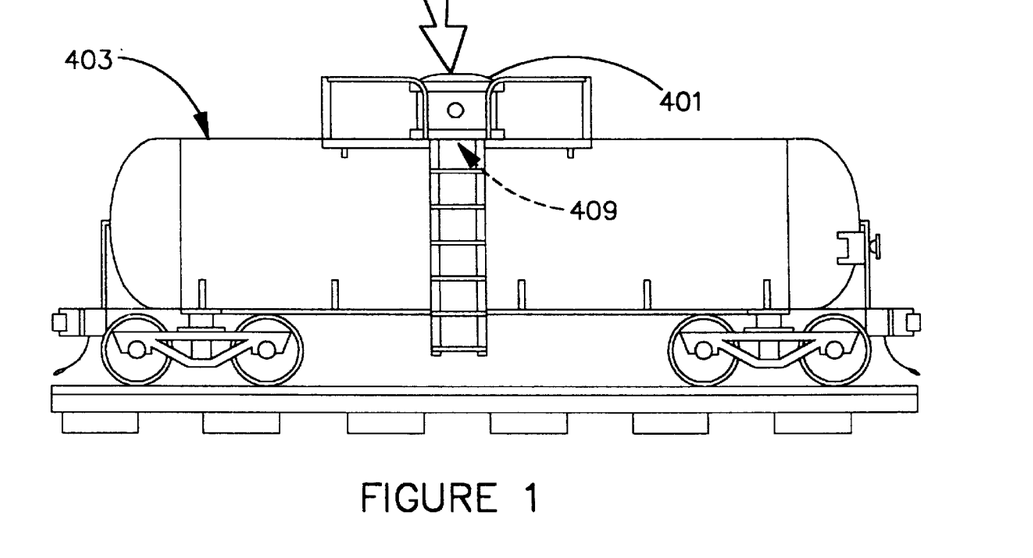
FIG. 1 is an elevation view of a tanker rail car with dome attached.

Turning to the drawings, FIG. 1 shows a tanker railcar 403. Standard tanker railcars 403 has an opening in the top of the tanker to access the interior of the car. FIG. 1 also shows railcar dome 401 attached to tanker railcar 403. Railcar dome 401 covers and protects equipment, such as valves, placed therein.

Figure 2:
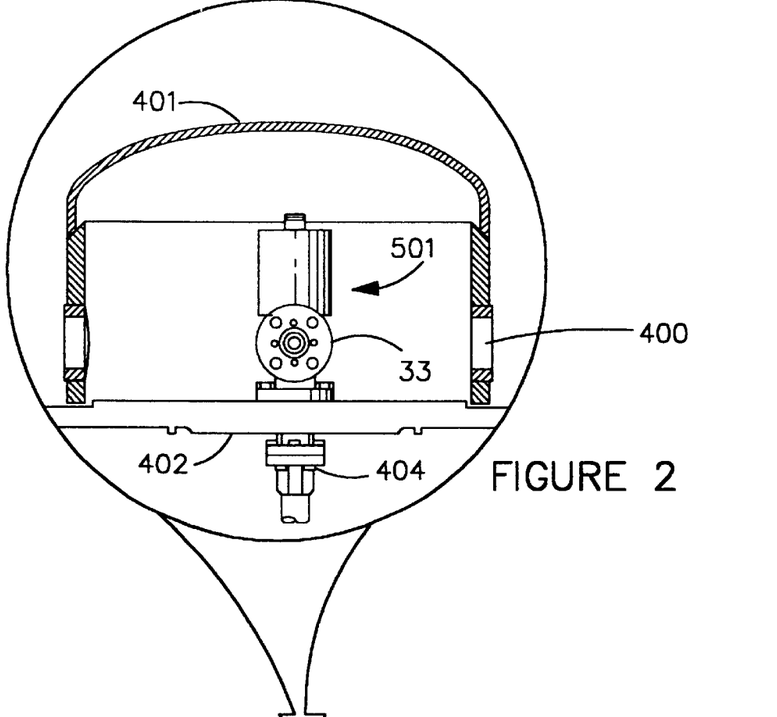
FIG. 2 is a cross-sectional view of a tanker railcar dome of a railcar such as shown in FIG. 1.

FIG. 2 shows a sectional view of an attached railcar dome 401. Shown are dome port openings 400 through the railcar dome 401. Dome port openings 400 allow restricted access to the valves positioned inside the railcar dome 401 without removal of the railcar dome 401 (top curved portion of dome 401 is hinged to bottom portion of dome 401, allowing access to the interior for repairs/replacements, etc.). Both the railcar dome 401 and dome port openings 400 are standard sizes as specified by the American Association of Railroads ("AAR"). Also shown is a valve 501 mounted on a manway 402. Manway 402 is a standard cover for the opening in the top of the tanker railcar 403 (a "196 type" manway, as specified by the Chlorine Institute). Finally, FIG. 2 shows one industry standard check valve 404 mounted on the bottom surface 402b of manway 402 and extending downwardly into the interior of the tanker railcar 403. Checkvalve 404 would remain in place in the event of an accident where railcar 403 derails and rolls, shearing off the railcar dome 401 and the valves inside the railcar dome 401.

Prior Art

Figure 3:
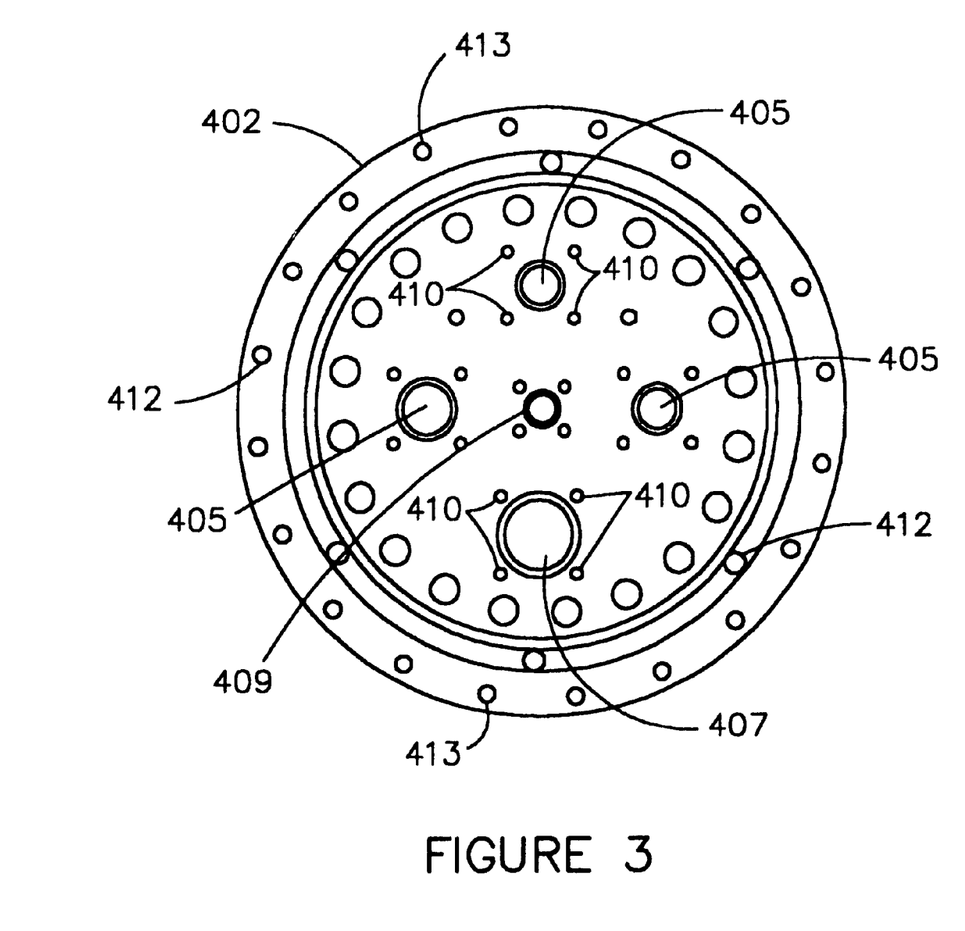
FIG. 3 is a top view of prior art manway cover of a railcar.
Figure 9A:
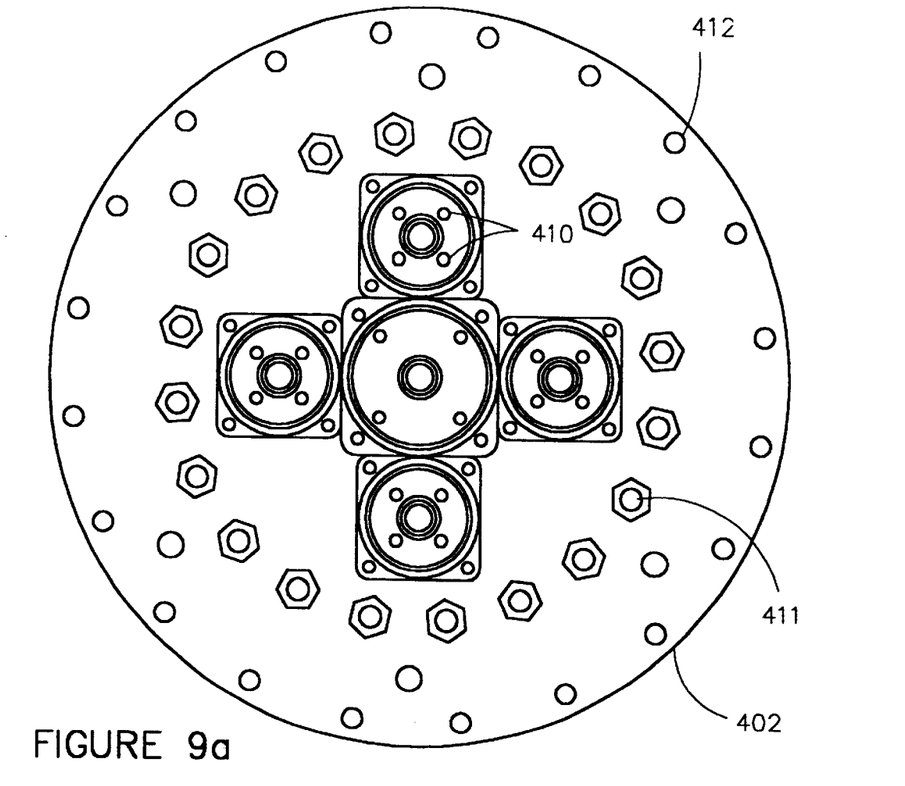
FIG. 9 shows another embodiment of the manway cover (9a top view, 9b cross-sectional view)

FIG. 3 is a top view of an existing manway 402. As shown, manway 402 has three openings 405 to any one of which a loading valve 501 can be inserted. Also shown is an opening 406 to which a safety release valve 502 may be inserted. At the center of the manway cover is an attachment slot 409 for a gaging device. The area surrounding each valve opening (405 or 406) where the valve attaches to the manway 402 is referred to as a valve mounting area. FIG. 3 shows one embodiment of an existing manway 402. Other configurations exist, such as manway having 4 openings for loading valves, with a fifth center opening for a safety relief valve, as indicated in the improved cover depicted in FIG. 9A. Surrounding each opening 405 or 406 are 4 bolt holes 410 to which the valves are bolted to the manway 402. Along the circumference of the manway 402 are a series of attachment openings 411 that allow the manway cover to be attached to the tanker. Generally, attachment is by a series of bolts attaching to the tanker. Also shown are drain holes 412 which allow spilled substances or rainwater to flow off the manway 402. Finally, a series of stud holes 413 are placed along the outer circumference, to secure the dome to the pressure plate.

Figure 4:
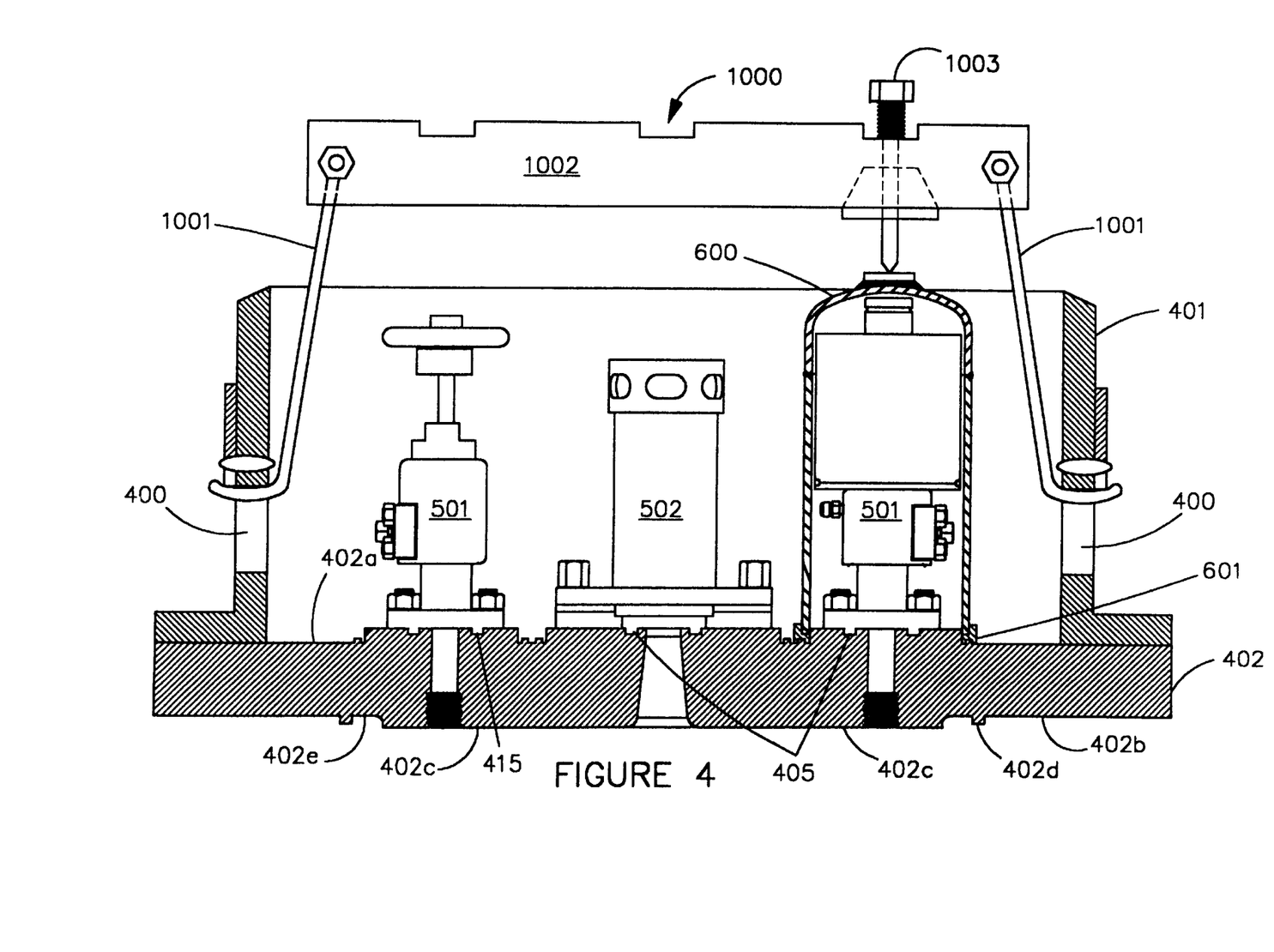
FIG. 4 is a partial cross sectional view of a prior art manway cover.
Figure 5:
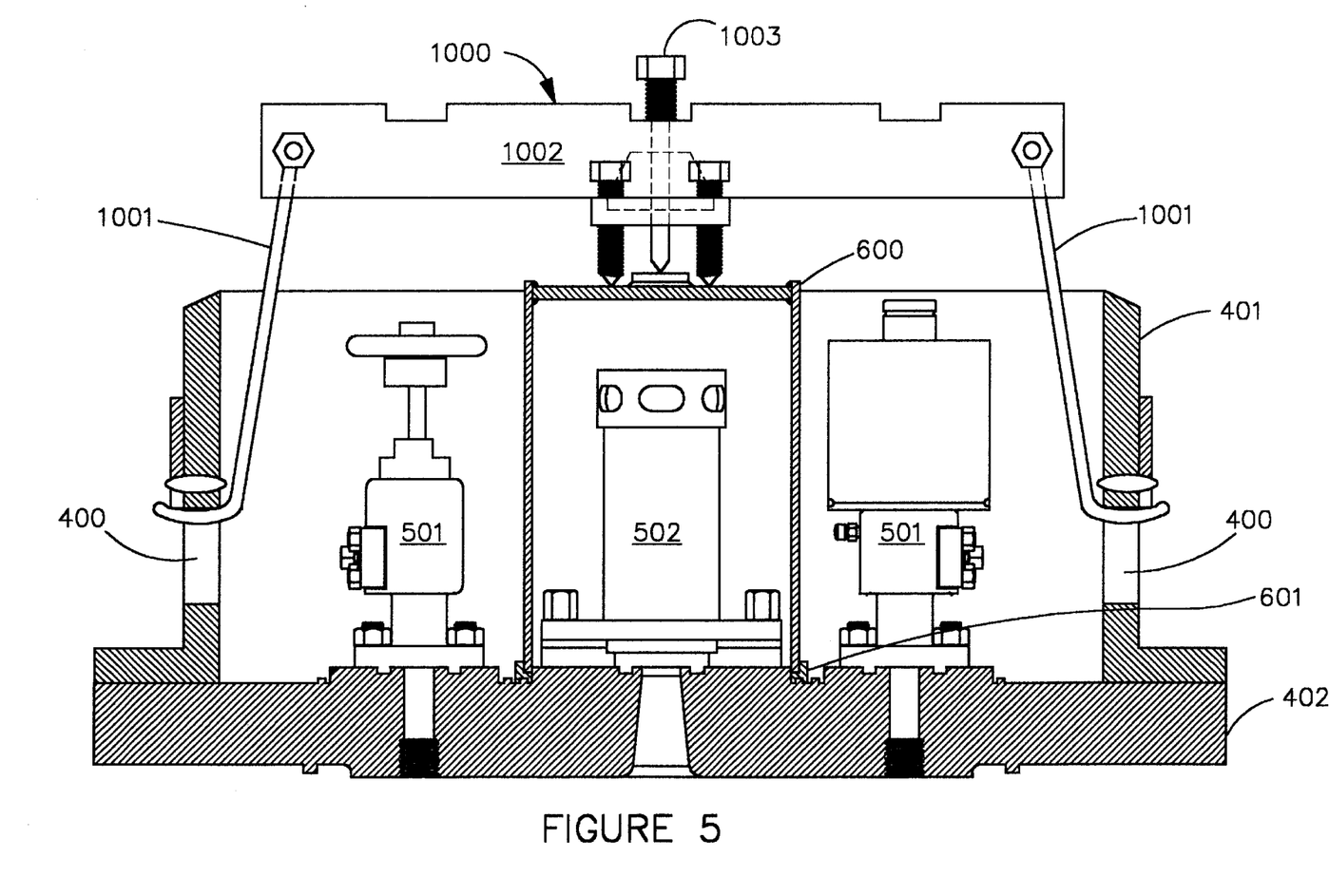
FIG. 5 is another partial cross sectional view of a prior art manway cover.

FIGS. 4 and 5 show a center cross section through existing manways 402. Shown are two loading valves 501, pressure relief valve 502, dome 401 with port openings 400 and a prior art emergency hood 600, and hood hold down mechanism 1000. As can be seen, the top surface 402*a* of the manway is essentially flat. Manway 402 does have channels 415 surrounding each valve opening (405 or 406) which is a scat for an attached valve. Generally, a gasket is placed in the channel 415, the base of the valve is then placed in the channel, and the valve is bolted to the manway 402 sealingly attaching the valve to the manway.

Figure 6:
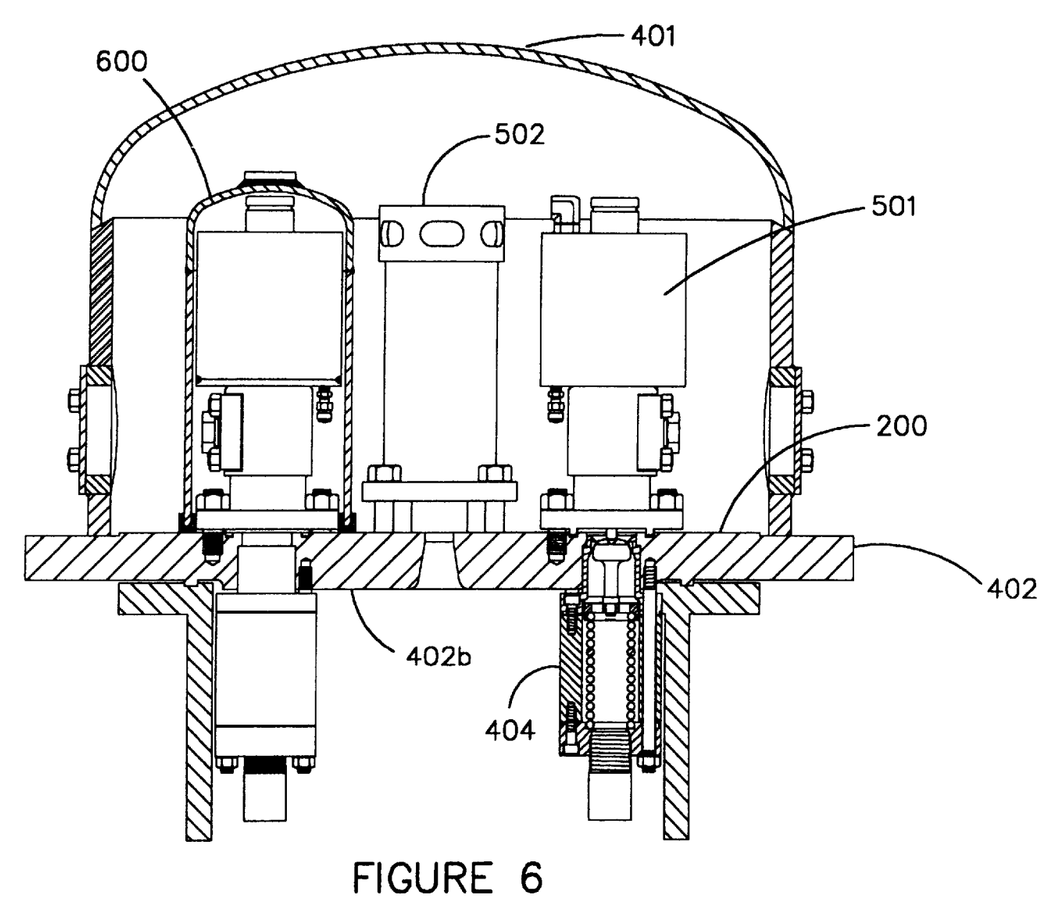
FIG. 6 is a cross sectional view of prior art manway showing details of the tank attachment.

As shown, the bottom surface 402*b* of the manway 402 has a first raised area 402*c* and a second raised area 402*d*, the first and second raised areas being separated by recess 402*c*. When the manway 402 is bolted to a tank, the first raised area 402*c* will extend into the tank opening, as is depicted in FIG. 6. Top of tank has a lip which interlocks with recess 402*e*, much like a tongue and grove joint. Gaskets will be placed in the contact areas of the tank and manway to sealingly join the manway to the tank, as shown in FIG. 6.

FIG. 5 differs from FIG. 4 in that the emergency hood 600 is positioned over the center pressure relief valve. Note that the emergency hood for the pressure relief valve (FIG. 5) is of different size and shape then the emergency hood for the loading valves shown in FIG. 4. Shown in both FIG. 5 and 6 are hood gasket 601 located at the base of the emergency hood 600. Hood gasket 601 is designed to sealingly isolate the interior of the emergency hood 600 from the exterior, and thereby isolate a leaking valve. The area of contact of the emergency hood or the hood gasket with the manway cover will be referred to as the "hood contact area" of the manway. As shown in FIGS. 4 and 5, emergency hood 600 is held in place with hold down mechanism 1000. Hold down mechanism 1000 is a cumbersome device having J hooks 1001 designed to hook to the openings 400 in the tank dome 401. J hooks 1001 are joined to a yoke 1002. A threaded rod and plate 1003 is positioned on yoke 1002 and threaded rod is designed to contact emergency hood 600. Turning threaded rod thus raises yoke 1002 until J hooks 101 are restrained from further upward movement by contact with dome opening 400. Further turns of the threaded rod will apply a downward force to emergency hood 600, forcing hood gasket 601 into tight contact with hood contact area of top surface of manway 402*b*.

The hood contact area on the manway top surface 402*b* is to be a sealing area. However, if this area becomes pitied, the hood gasket may fail to seal, thus defeating the purpose of the emergency hood. If the hood contact area is isolated from the elements during normal use (that is, when no emergency hood is installed), the hood contact area should remain an effective sealing area. Other details of the valves and prior art designs can be found in U.S. Pat. No. 5,924,672, herein incorporated by reference.

New Design

Figure 7A:
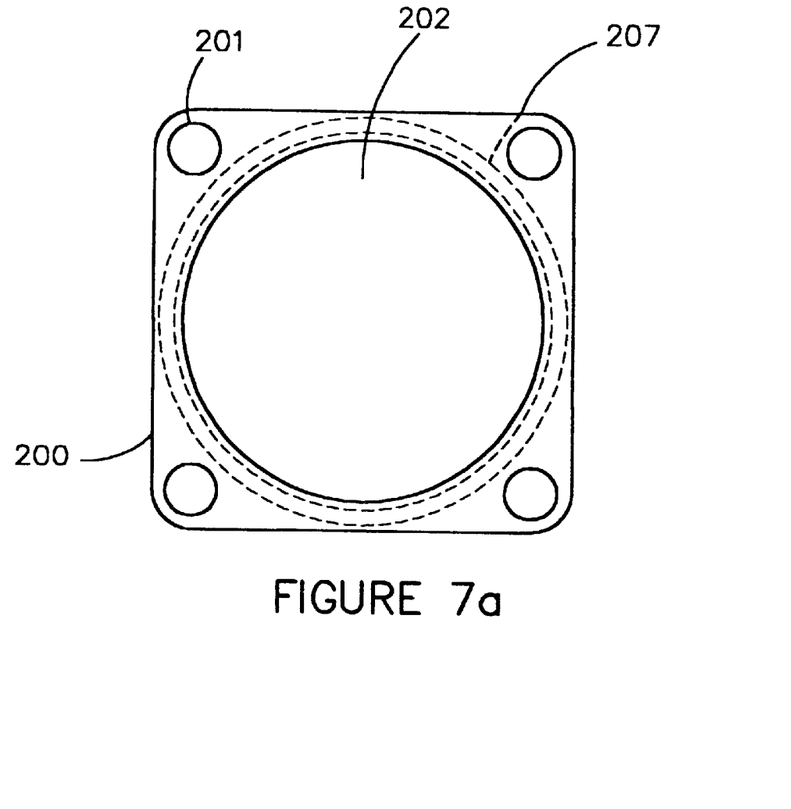
FIG. 7a is a top view of one embodiment of the flange.
Figure 8A:
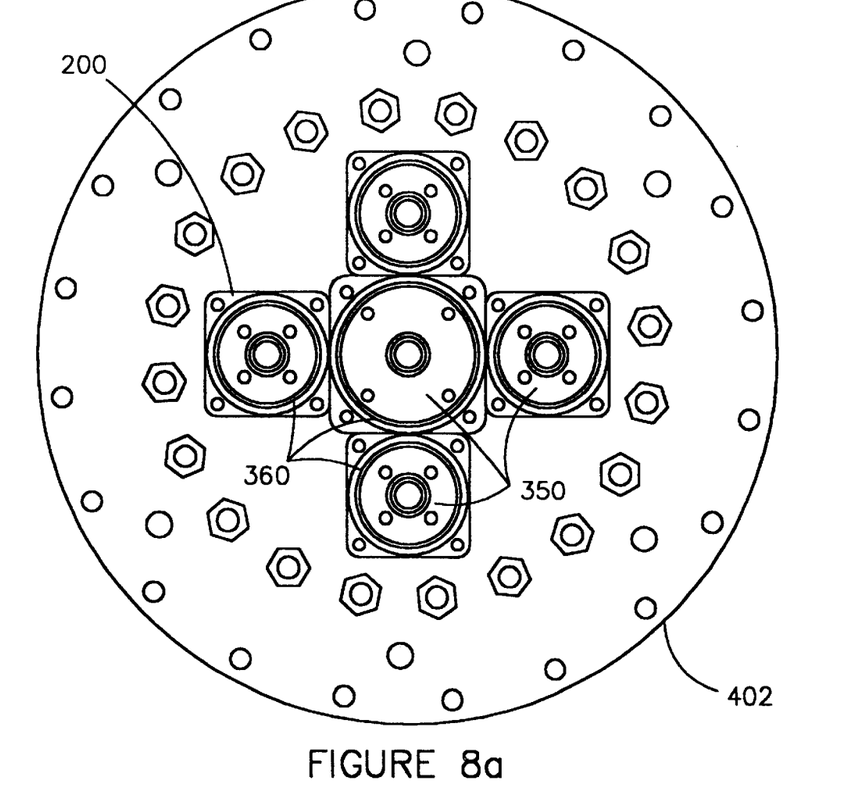
FIG. 8a shows top views of emergency hoods.

The new design entails changes to the top surface of the manway. No modifications are needed for the invention to the underside of the manway. To protect the hood contact area, a protective flange 200 is attached to the manway 402 over the hood contact area. Shown in FIGS. 7*a* is a top view of one type of flange 200. Flange 200 is a square plate having a center opening 202 to accommodate an installed valve, so that the flange 200 can be removed without the need to disturb or remove the valve. The flange 200 is designed to be bolted to the manway through bolt holes 20. The manway 402 must have threaded openings to accept bolts for attaching the flange. A square shaped flange 200 is preferred due to the restrictions imposed by design of existing manways. For instance, FIG. 8*a* shows a top view of a manway 402 with 5 flanges 200 installed over valves 501 and 502. A square base on the flange allows a flange 200 to be placed around the hood contact area of each valve without the interference of adjacent flanges, and without interference with manway attachment bolts 420. The corners of the square flange provide the surface area needed to bolt the flange to the manway 402. Note that the flange 200 positioned around the pressure relief valve 502 is larger.

Flange opening 202 is sized to slip over an installed valve. Flange 200 could also be hinged or in constructed of two or more parts to allow flange 200 to be installed (or removed) without disturbing an installed valve. It is preferred that a gasket be positioned between flange 200 and hood contact area. Preferably, gasket should be resistant to the materials carried in the tank.

Figure 8B:
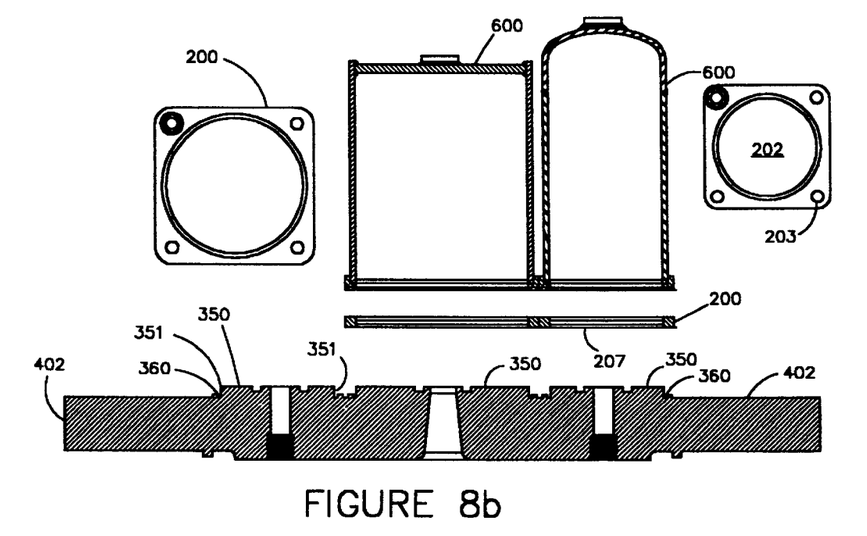
FIG. 8b shows cross-sectional views of emergency hoods.

Other embodiments of the manway cover system include modifications to the manway near the hood contact area or valve mount areas, with suitable modifications to the flange 200 for protecting a modified hood contact area. For instance, it is preferred that the hood contact area be at a higher elevation than the remaining surface to the manway, to assist in run off from this sensitive area. Shown in FIGS. 8*a* and 8*b* are manway 402 where the valve mounting areas are raised pads 350 upon which the valves are positioned. As shown, raised pads 350 are circular raised areas with center opening to allow the valve to access the interior of the tank. Surrounding this raised pad 350 is a second raised surface 360. As shown, second raised surface is an annular ring surrounding raised pad 350, with second raised surface being at an elevation between the manway main surface and raised pad 350. Second raised surface 360 is one area of contact with the emergency hood, and the vertical side wall 351 of the raised pad will be another area of contact with an emergency hood.

Figure 7B:
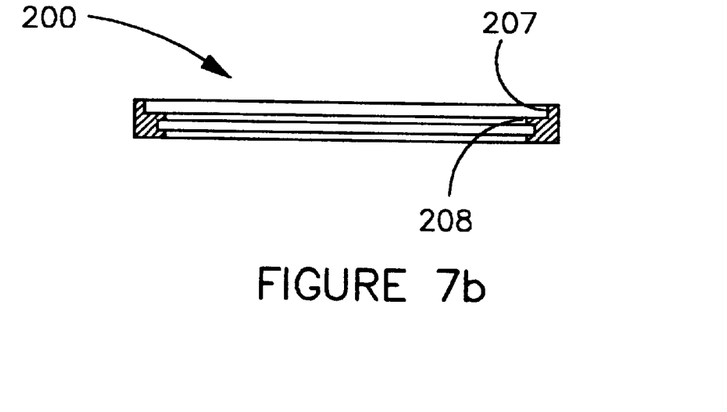
FIG. 7b is a crossectional view of one embodiment of the flange.

Surrounding second raised surface are holes for attaching a protective flange. One embodiment of protective flange is shown in figure adapted to interface this modification to the manway is detailed in FIGS. 7a and 7b. As shown, protective flange 200 has a square base plate, center opening 202, and holes 203 through base plate to allow for attachment to the manway. Protective flange may also have a bottom downwardly extending lip 207 surrounding center opening 202. Lip 207 is designed to extend over the circumference of the second raised surface 360 of manway. Flange 200 may additionally accommodate an O-ring, for providing an additional protective seal against the vertical side wall 351 of the raised pad 350. As shown, flange 200 has a channel 208 formed in the walls which form center opening 202 to accommodate an o-ring.

In operation, a gasket would be placed upon the annular second raised area 351. Protective flange 202 can then be installed on second raised area, and bolted down, thereby protecting second raised surface, which is part of the hood contact area. As the flange 200 is torqued down onto manway 402, lip 207 passes over the outer circumference of the second raised area. In this fashion, the second raised area is completely isolated from the external environment, and, additionally, the flange lip 207 completely encases an installed gasket, protecting the gasket from the external environment. O-ring also helps seal by bearing against vertical side wall 351 of raised pad 350.

Gasket materials should also be inert to the materials contained in the tank; fluorocarbon materials may be appropriate (such as Viton, available from Dupont), PTFE, or carbon and glass filled PTFE may be suitable. PTFE, however, has a tendency to "cold flow" under pressure, and if used, it may be desirable to include serrated edges or ridges on the surfaces against which the PTFE bears to help resist "cold flow." Other suitable gasket materials may include compressed asbestos, such as chrysotile asbestos, available as Garlock 900 from Garlock, Inc., and nitrile, available as BUNA-N from Dupont. Note that the contact surface of the protective flange with the gasket is shown as grooved, to prevent cold flow of the PTFE gasket.

Figure 9B:
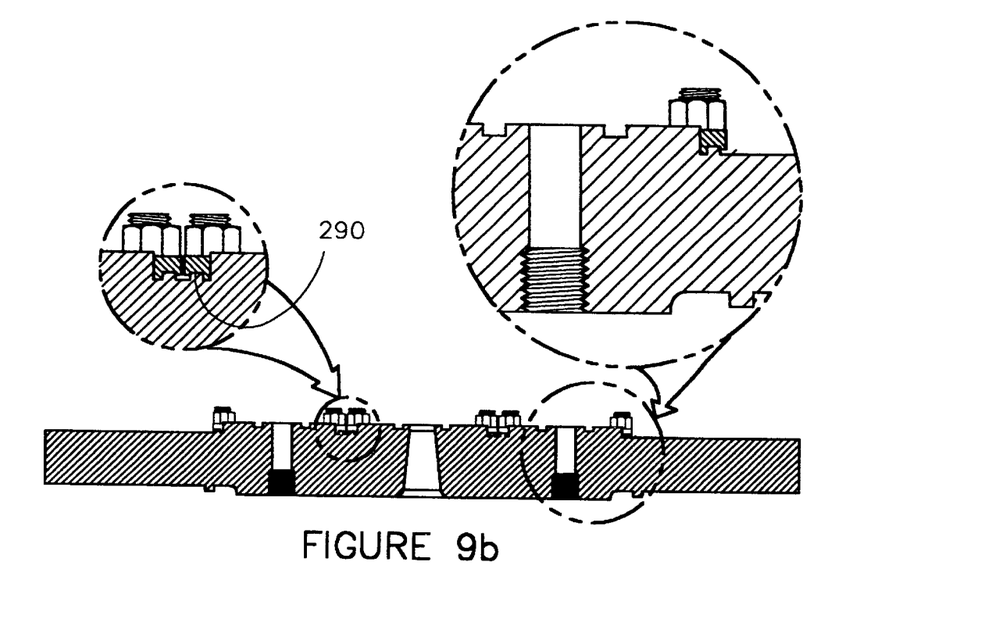
Figure 9C:
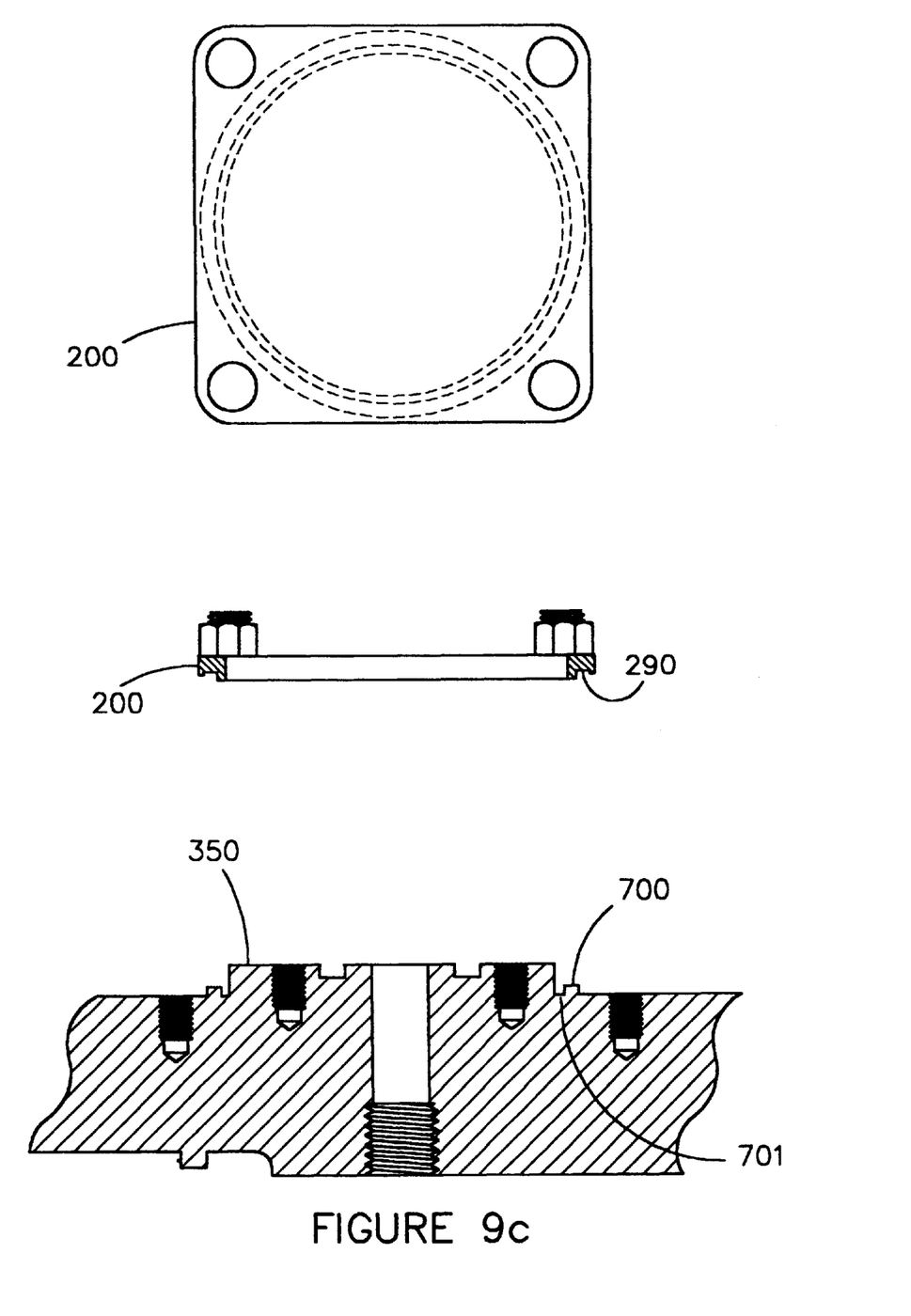
FIG. 9c shows a flange designed to interlock with the manway of FIGS. 9a and 9b, in cross-section and overhead view.

Other embodiments of hood contact area are possible. For instance, in the above mentioned embodiment, the second raised pad could be dispensed with. Hood contact area would thus be at the same elevation as the majority of the manway. In this instance, flange would not incorporate lip 207, and a face sealing gasket would be required. Because lip 207 of protective flange would be removed, the edge of the gasket would be exposed, and is not preferred. Alternatively, hood contact area could be a circular channel or grove cut into manway and surrounding the valve opening. The protective flange would thus be a male tongue insertable into channel (with a gasket interposed). Obviously, other geometries of interlocking hood contact area and protective flange are possible. For instance, shown in FIG. 9 is an alternative arrangement to the hood contact geometry and protective flange. Hood contact area is a raised tongue 700 separated from a raised pad 350 by a channel area 701. As shown in FIG. 9b, flange 200 has a U-shaped channel 290 interlocking with hood contact area. In the U-shaped channel is placed a gasket. FIG. 9c shows the flange 200 top view and cross-section.

Once the geometry of the hood contact area and covering flange is determined, the optimal base structure of the emergency hood is also determined. In general, the base structure of the emergency hood should be nearly identical to that of the protective flange; that is, the base of the emergency hood functions as a protective flange. In this instance, if a leak develops in a valve, the installed protective flange would be removed (without disturbing the installed valve), and the emergency hood installed over the leaking valve, and attached to the manway cover in the same fashion as the removed flange was installed. That is, because the flange directly attached to the manway, the emergency hood may also directly attach to a manway (such as with bolts or other such devices) and dispense with the indirect means (the J-bolts and yoke) of contacting the emergency hood with the manway. To prevent leaks, it is preferred that the "flange area" of the emergency hood be attached to the hood via a continuous weld.

For instance, shown in FIG. 8 are emergency hoods 600 designed to be attached to the manway 402 depicted in FIG. 8c. As can be seen, the base 605 of the emergency hood has the same structure as that of the protective flange shown in FIGS. 7a and 7b. The emergency hood has a square base plate with attachment holes therethrough for attachment to the manway, a channel for holding an o-ring, and a downward facing lip. While it is generally optimal that the base of the emergency hood match the installed protective flange, it is not necessary.

By attaching the emergency hood in a similar fashion as the protective flange, the prior art cumbersome means of sealing the hood to the manway can be dispensed with. Obviously, however, the operator can continue to utilize prior art emergency hood attachment mechanism with the new emergency hood designs.

We claim:

1. A manway cover system used to cover an opening in a tank, said manway cover system having a manway with a top and a bottom surface, at least one valve mounting area on said top surface for mounting a valve thereon, and a hood contact area surrounding each valve mounting area, said hood contact area being that portion of said top surface of said manway to be contacted by an emergency hood if an emergency hood was installed, and a flange, said flange attachable to said manway, said flange covering a portion of said hood contact area when so attached, said flange further having an opening therethrough adapted to allow attachment of said flange on said manway without removal of a valve when mounted on said valve mounting area.

2. A manway cover system according to claim 1 further having a gasket, said gasket positionable adjacent to a portion of said hood contact area.

3. A manway cover system according to claim 1 where said valve mounting area is a first raised pad.

4. A manway cover system according to claim 3 having a second raised pad, said second raised pad surrounding said first raised pad, said hood contact area including a portion of said second raised pad.

5. A manway cover system according to claim 4 wherein said second raised pad is at a lower elevation then said first raised pad.

6. A manway cover according to claim 1 further having an o-ring, said o-ring positioned between said flange and said hood contact area.

7. A manway cover system according to claim 4 where said flange has a baseplate, wherein said baseplate is attachable to said manway.

8. A manway cover system according to claim 7 where said flange further has a lip projecting downwardly from said base plate, said lip circumferential around said opening.

9. A manway cover system according to claim 7 wherein said base plate is square.

10. A manway cover system used to cover an opening in a tank, said manway cover system having a manway with a top and a bottom surface, a plurality of valve mounting areas on said top surface for mounting a valve on each of said plurality of valve mounting areas thereon, wherein said valve mounting surface is a raised pad, and a hood contact area surrounding each said raised pad, said hood contact area being that portion of said top surface of said manway to be contacted by an emergency hood if an emergency hood was installed.

11. A manway cover system according to claim 10 further having an emergency hood.

12. A manway cover system according to claim 11 wherein said emergency hood is boltable to said manway.

13. A manway cover system used to cover an opening in a tank, said manway cover system having a manway with a top and a bottom surface, at least one valve mounting area on said top surface for mounting a valve thereon, and a hood contact area surrounding each valve mounting area, said hood contact area being that portion of said top surface of said manway to be contacted by an emergency hood if an emergency hood was installed, and an emergency hood, said emergency hood being directly attached to said manway.

* * * * *